Aug. 28, 1928.
G. FRENKEL
1,682,497
SIGNALING DEVICE FOR MOTOR CARS AND THE LIKE
Filed Jan. 14, 1928    2 Sheets-Sheet 1
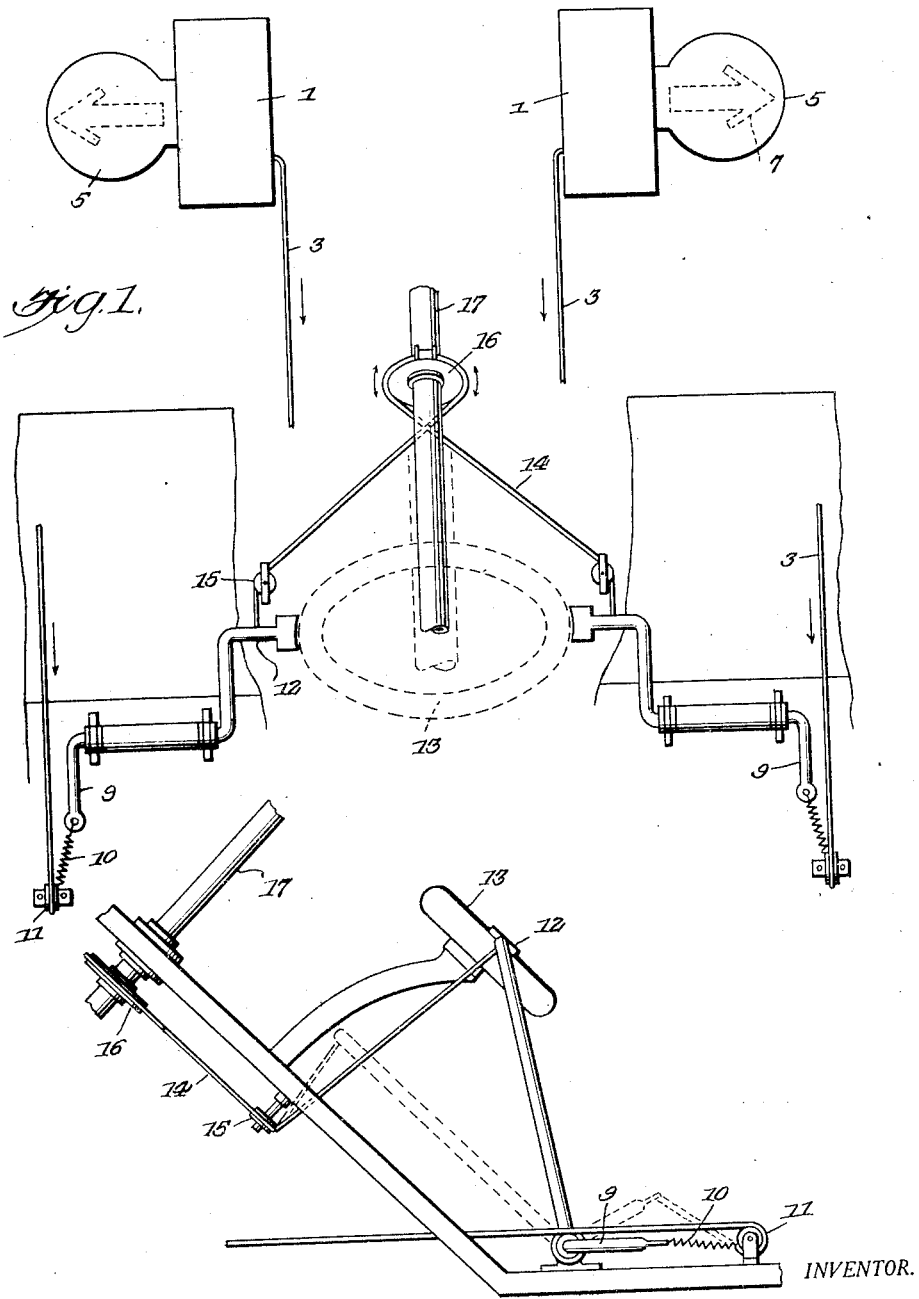

Aug. 28, 1928.　　　　　　　　　　　　　　　　1,682,497
G. FRENKEL
SIGNALING DEVICE FOR MOTOR CARS AND THE LIKE
Filed Jan. 14, 1928　　　2 Sheets-Sheet 2
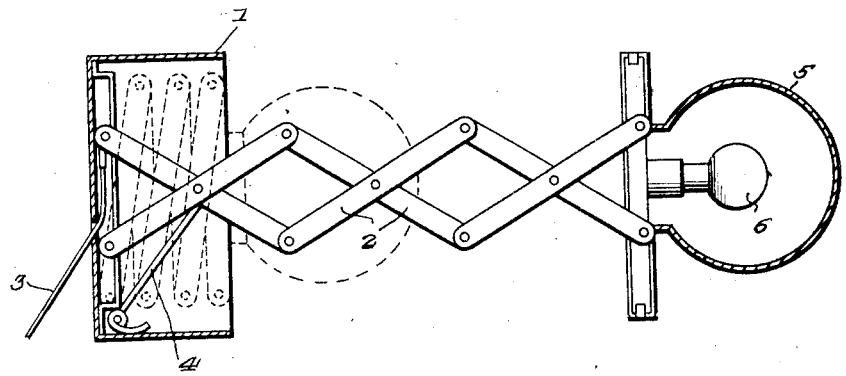
Fig.3.
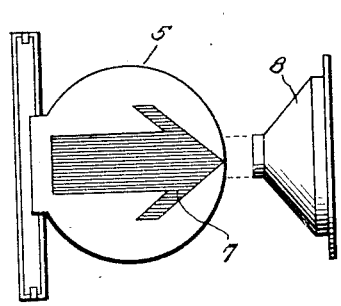 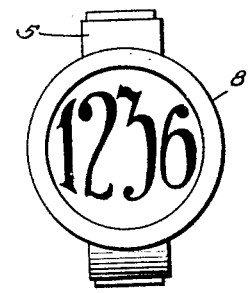
Fig.4.　　　Fig.5.
INVENTOR.
G. Frenkel,
BY
ATTORNEY.

Patented Aug. 28, 1928.

1,682,497

UNITED STATES PATENT OFFICE.

GUILLERMO FRENKEL, OF BUENOS AIRES, ARGENTINA.

SIGNALING DEVICE FOR MOTOR CARS AND THE LIKE.

Application filed January 14, 1928. Serial No. 246,774.

My present invention relates to signaling devices for motor cars and the like its main object being to provide a very simple signaling device, which may be automatically actuated, by means of the foot and also by the action of the steering wheel, so that the movements of said signaling device may be effected independently of the will of the driver.

Another object of my present invention is to provide a signaling device which at the same time may be used as a light for the motor cars.

The present invention has these and other objects in view which will be clearly understood from the following description and clearly set forth in the appended claiming clauses.

In order that my present invention be clearly understood and easily carried into practice, a preferred embodiment thereof has been schematically shown in the appended drawings, wherein, Figure 1 is a schematical view of the whole of the signaling device in its closed position.

Figure 2 is a side view of the operating means.

Figure 3 shows the signaling device proper in its open position, and

Figures 4 and 5 are rear and side views respectively of the said device.

Similar characters of reference denote same or like parts throughout the said figures.

Each of the signaling devices proper, which are suitably fixed at the sides of the car at any convenient position, consists of a box 1 wherein a pliable or extensible device 2 is contained, said device being suitably guided in said box as shown in 2 so that it may be opened by means of a flexible cable 3. A spring 4 tends to keep the device in its closed position. At the other end of the device a box 5 is fixed, said box containing a lamp 6 and having preferably at the back face an arrow 7 or the like. If desired, the box 5 may have an extension 8 bearing a glass or the like wherein the number of the car may appear.

For the purpose of its action, the extensive device 2 is connected by means of the cable or the like 3 to a lever 9 suitably mounted on the floor of the driver's seat, said cable being connected by means of a spring 10 and passing over pulleys 11. Said lever is cranked and the other end thereof 12 corresponds to the side of the brake pedal 13, as clearly shown in the figures. With the above disposition it is obvious that the driver, on pressing the pedal 13 and inclining his foot towards the right or the left will be able to give the corresponding signals, said signals remaining in the extended position, until the pressure is relieved. By simultaneously pressing both levers 12 it is also obvious that both signals will be simultaneously extended, so that a "stop" or danger signal may be given.

The levers 12 are connected by means of crossed cables 14 passing over guide pulleys 15 to a pulley 16 fixed to the axle of the steering wheel 17. In this manner, the turning of the steering wheel in one sense or the other will also determine the action of the signaling devices as clearly explained in the foregoing paragraph.

The manner of working of the device is obvious and does not require any further explanation.

It is also obvious that many constructional changes may be introduced without departing from the scope of my present invention which is clearly set forth in the appended claiming clauses.

Having now fully described and ascertained the nature of my present invention and in what manner the same is to be carried into practice, I declare that what I claim and desire to protect by Letters Patent is:

1. A device for operating a signal for motor cars comprising a box adapted to be secured to the side of the car and having a signal associated therewith; a lever mounted adjacent the foot pedal of the car; a cable connecting the signal with the lever; and means connected to the steering post of the motor car and connected to the lever for operating the signal irrespective of the operation of the pedal.

2. A device for operating a signal for motor cars comprising a lever mounted adjacent the foot pedal of the car; a cable connecting the signal with the lever so that on depression of the pedal the lever and signal may be operated; and means connected to the steering post of the motor car and connected to the lever for operating the signal irrespective of the operation of the pedal.

3. A device for operating a signal for motor cars comprising a box adapted to be secured to the side of the car and having a signal associated therewith; a cranked lever mounted adjacent the foot pedal of the car; a cable connecting the signal with the lever so that on depression of the pedal the lever and signal may be operated; a pulley mounted on the steering post of the motor car; and a cable connecting the pulley with the lever for operating the signal irrespective of the operation of the pedal.

4. A device for operating a signal for motor cars comprising an extensible device secured at one end to each side of the car and having the signal secured to the other end; a lever mounted on each side of a pedal of the motor car; a cable connecting each extensible device with each lever so that on depression of the pedal one or the other or both of the levers and extensible device may be operated; and means connected to the steering post of the car and to each lever for operating one or the other of the extensible devices irrespective of the operation of the pedal.

5. A device for operating a signal for motor cars comprising an extensible device secured at one end to the car and having a signal at the other end; a lever mounted adjacent the foot pedal of the car; a cable connecting the extensible device with the lever so that on depression of the foot pedal the lever and extensible device may be operated to operate the signal; and means connected to the steering post of the car and connected to the lever for operating the extensible device and signal irrespective of the operation of the foot pedal.

6. A device for operating a signal for motor cars comprising a lever mounted adjacent the foot pedal of the car; means connecting the signal with the lever so that on depression of the pedal the lever and signal may be operated; and means connected to the steering post of the motor car and connected to the lever for operating the signal irrespective of the operation of the pedal.

In testimony whereof I affix my signature.

GUILLERMO FRENKEL.